United States Patent [19]
Gresty

[11] Patent Number: 4,483,584
[45] Date of Patent: Nov. 20, 1984

[54] OPTICAL FIBER CONNECTOR

[75] Inventor: John B. Gresty, Westlake Village, Calif.

[73] Assignee: Automation Industries, Inc., Greenwich, Conn.

[21] Appl. No.: 306,330

[22] Filed: Sep. 28, 1981

[51] Int. Cl.³ .............................................. G02B 7/26
[52] U.S. Cl. ................................................. 350/96.21
[58] Field of Search ................ 350/96.20, 96.21, 96.22

[56] References Cited

U.S. PATENT DOCUMENTS

| | | | |
|---|---|---|---|
| 4,047,796 | 9/1977 | Kao et al. | 350/96.21 |
| 4,056,305 | 11/1977 | McCartney et al. | 350/96.21 |
| 4,099,832 | 7/1978 | Warner, Jr. | 350/96.21 |
| 4,132,461 | 1/1979 | Jacques et al. | 350/96.20 |
| 4,161,347 | 7/1979 | Tardy | 350/96.21 |
| 4,217,031 | 8/1980 | Mignien et al. | 350/96.21 |
| 4,370,022 | 1/1983 | Johnson | 350/96.21 |

FOREIGN PATENT DOCUMENTS

| | | | |
|---|---|---|---|
| 0028790 | 5/1981 | European Pat. Off. | 350/96.21 |
| 1558914 | 1/1980 | United Kingdom | 350/96.21 |

*Primary Examiner*—John D. Lee
*Attorney, Agent, or Firm*—Francis N. Carten

[57] ABSTRACT

An optical fiber has an insulative coating portion stripped leaving an extent of bare fiber. A fiber contact housing has an opening within which the fiber is located in the interstice of three cylindrical pins arranged parallel and contacting each other. The inner end portions of the pins are ridged to clamp onto the insulative material covering the fiber adjacent the bare fiber. A shield is placed around the inner ends of the pins and crimped about the pins and fibers. By use of a fixture the faced-off end of the fiber is located just inwardly of the outer ends of the pins, this assembly constituting a "contact" and a second fiber is assembled into a second "contact". An alignment sleeve has a leaf spring wall to resiliently retain and align the two fiber contacts received within the sleeve ends in proper fiber end spacing relation.

5 Claims, 22 Drawing Figures

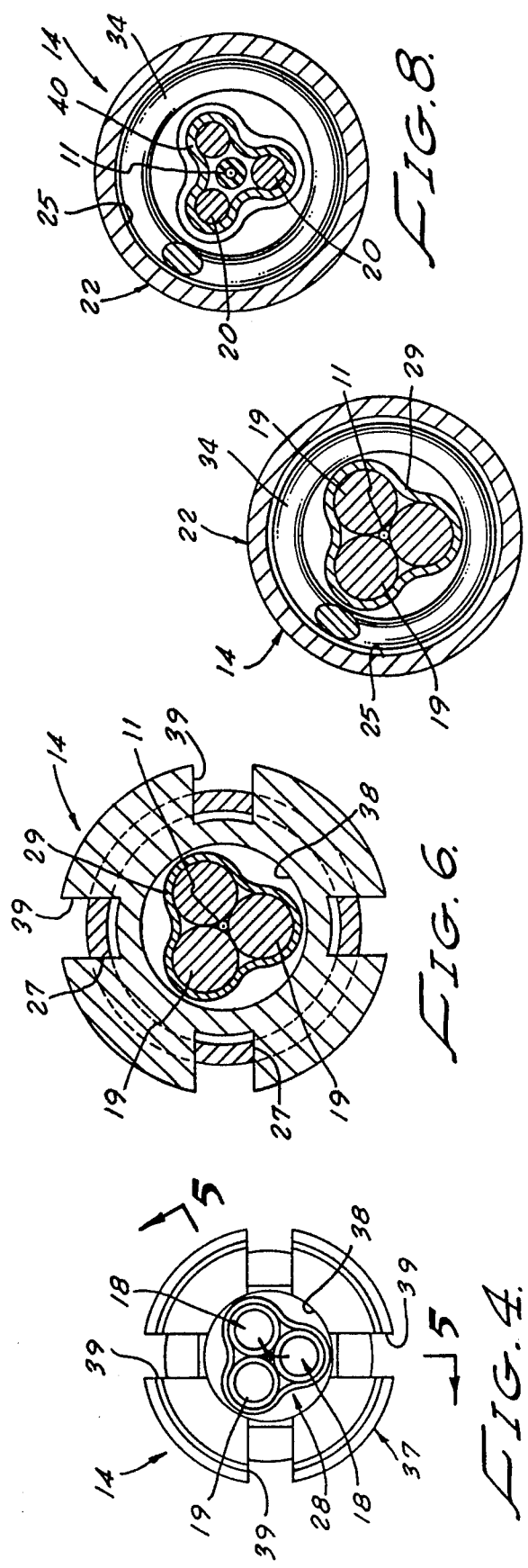
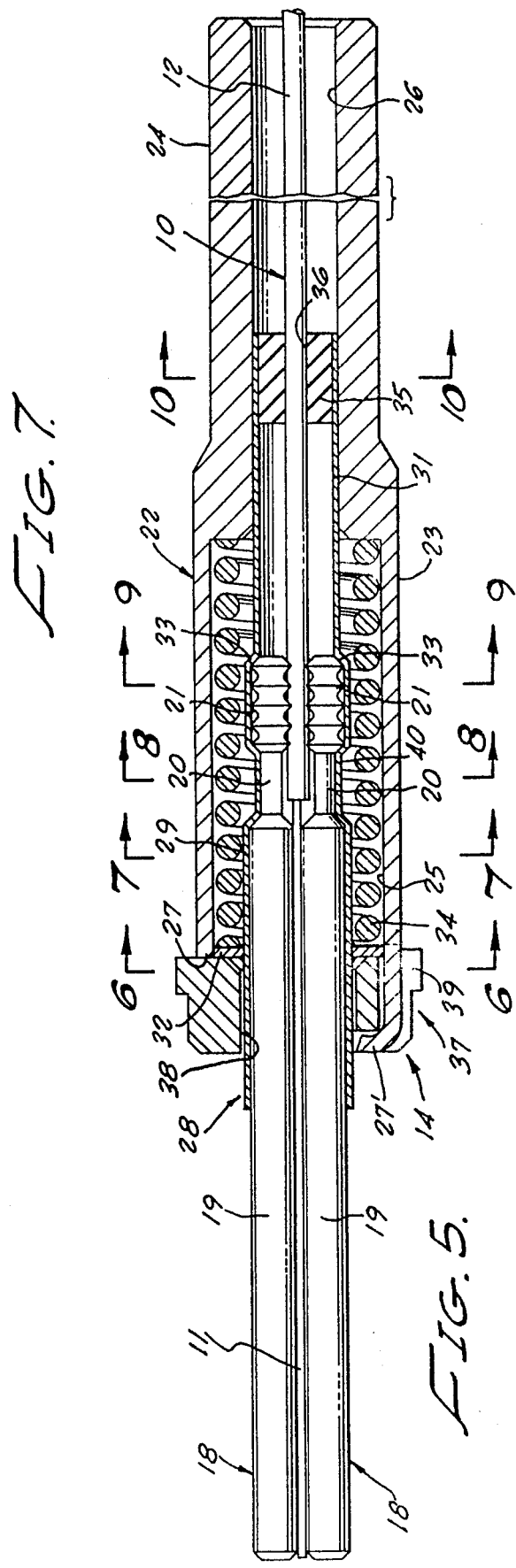

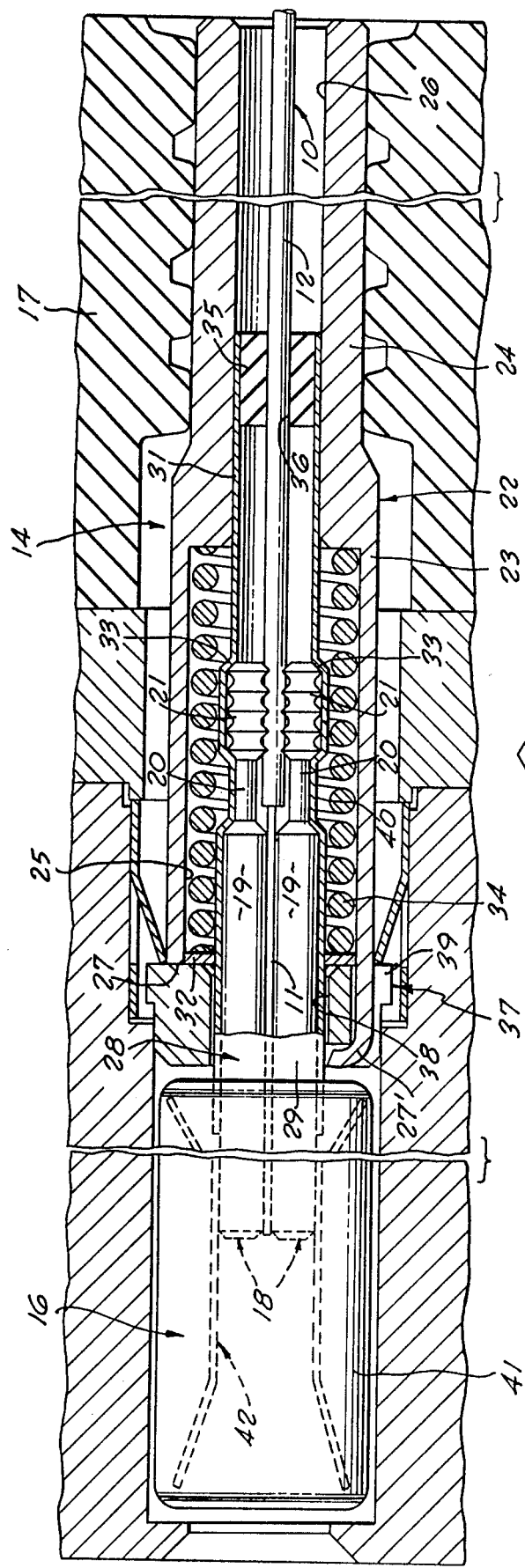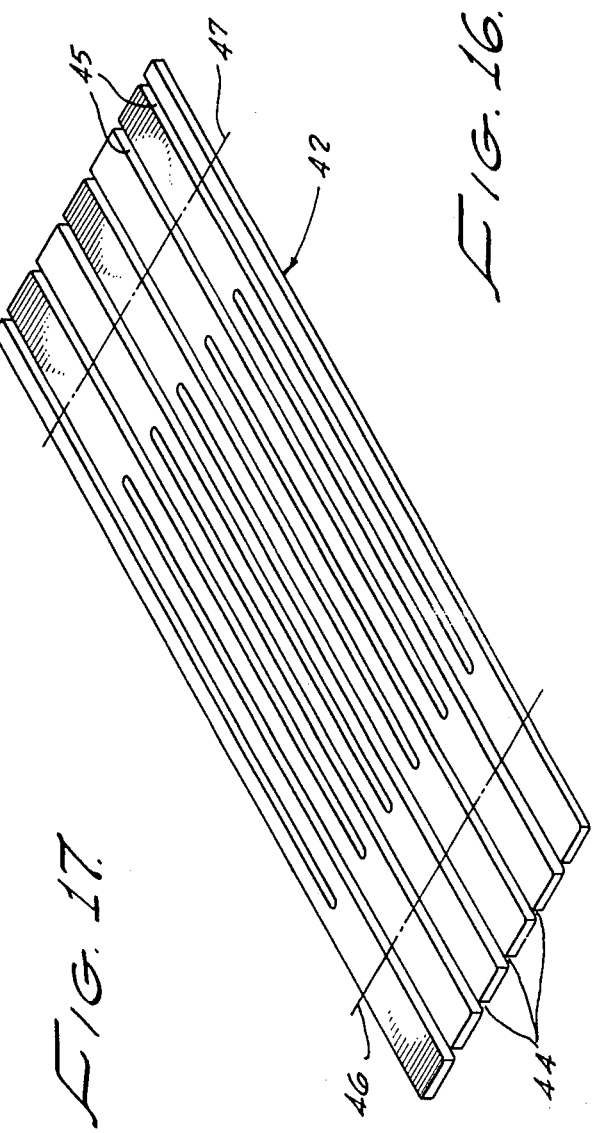

OPTICAL FIBER CONNECTOR

The present invention relates generally to a connector for use with optical fibers and, more particularly, to an improved connector which can be used to effect connection between optical fibers under field conditions.

BACKGROUND OF THE INVENTION

Optical fibers are relatively small glass or plastic fibers (e.g., several thousandths of an inch in diameter) which are being widely used for the transmission of optical signals to a remote location for processing or other utilization. On occasion it becomes necessary either to interconnect two fibers or to repair a fiber which has been broken. In order not to degrade performance beyond an acceptable degree, satisfactory interconnection of two such fibers requires that the fiber ends be faced off at right angles, with the facing ends aligned and brought into close proximity. It is also important that the two fibers not actually touch one another as this may cause their end portions to be distorted from true alignment or become degraded through abrasion.

Techniques and devices utilized in the past for obtaining such interconnection have been complex, expensive and difficult to use, especially under field conditions and, therefore, have not been found to be completely satisfactory. Certain optical connectors have included high precision parts and, in some cases, epoxies or other adhesives were required to secure the fibers in place. Moreover, such known connectors necessitated laboratory style approach to assembly which also increased cost of the connectors and limited their use.

Still further, it is desirable that an optical fiber connector protect the fiber from breakage, retain the fiber against so-called "end slip", as well as have the capability of being reused in the event of fiber damage while in the connector.

SUMMARY OF THE INVENTION

An optical fiber to be interconnected has one end portion stripped of an insulative coating or covering which is typically provided leaving an extent of bare glass or plastic fiber referred to as the fiber and which, in turn, may consist of a core with a cladding. A fiber contact housing includes a longitudinally extending opening therethrough within which the fiber is placed. Three cylindrical pins are arranged parallel and brought into contact with each other, the bare fiber end portion being received within the interstice between the pins. The inner ends of the pins include ridged portions which securingly contact the insulative material covering the fiber immediately adjacent to the stripped bare fiber, and in that way eliminating the need for an adhesive (e.g., epoxy) to achieve retention. A shielding and securing member is placed around the inner ends of the pins and crimped in place securing the pins and fibers together as a unit. The three pins, and included coated fiber and shield are received within a housing with the pins and fiber core extending outwardly of the housing with the outermost ends thereof being arranged coextensively. By use of a fixture the faced-off end of the fiber is located just inwardly of the outer ends of the pins. This assembly constitutes what is termed a "contact". A second fiber to be interconnected with the first described fiber is assembled in a second contact housing in the same manner.

A hollow tubular alignment sleeve has its inner side walls constructed of a plurality of leaf springs which coact to resiliently retain and align the two fiber contacts received within the respective sleeve ends. The fiber contacts can be inserted into the sleeve and removed therefrom in a quick-connect-disconnect manner.

It is contemplated that the described fiber contacts can be advantageously employed by affixing them in proper alignment within the parts of a plug and receptacle connector, such that on mating of the plug and receptacle parts the contacts are interconnected within the respective alignment sleeves. The pair of contacts mated within the alignment sleeve forms a truly field operable, high quality fiber optic interconnection.

DESCRIPTION OF THE DRAWING

FIG. 4 is an end elevational view of the fiber contact of FIG. 3.

FIG. 5 is a side elevational sectional view taken along the line 5—5 of FIG. 4.

FIGS. 6, 7, 8, 9 and 10 are sectional, end elevational views taken along the respective lines of FIG. 5.

FIG. 16 is a perspective view of a leaf spring used in the alignment sleeve shown in flat condition.

FIG. 17 is a sectional, elevational view of a fiber contact and alignment sleeve shown operatively related.

DESCRIPTION OF PREFERRED EMBODIMENTS

The connector to be described herein can be readily utilized for optically interconnecting two ends of a single glass optical fiber which has been broken or otherwise severed, or the ends of two separate fibers. As shown best in FIG. 11, a jacketed optical fiber 10 includes a glass or plastic fiber 11 consisting of a glass or plastic core and a cladding which is coaxially concentric with an insulative protective coating or covering 12. In use, an optical signal entering at one end of the fiber core traverses the full length of the fiber and exits at the other end. In the event two fibers or two pieces of the same fiber are to be connected, the ends of the fibers to be mated must be faced off cleanly and precisely at 90 degrees and the fibers must be precisely aligned, or otherwise the light beam passing across the connective junction will suffer reflection and/or absorption losses that degrade the beam.

Figure 1:
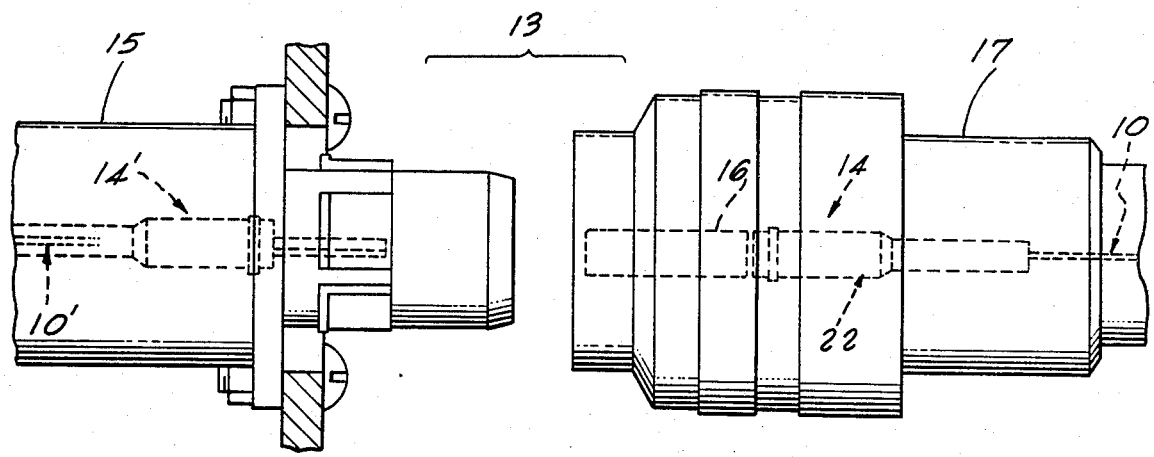
FIG. 1 illustrates disconnected connector parts of a typical plug and receptacle connector for including the fiber optic contacts of this invention.
Figure 2:
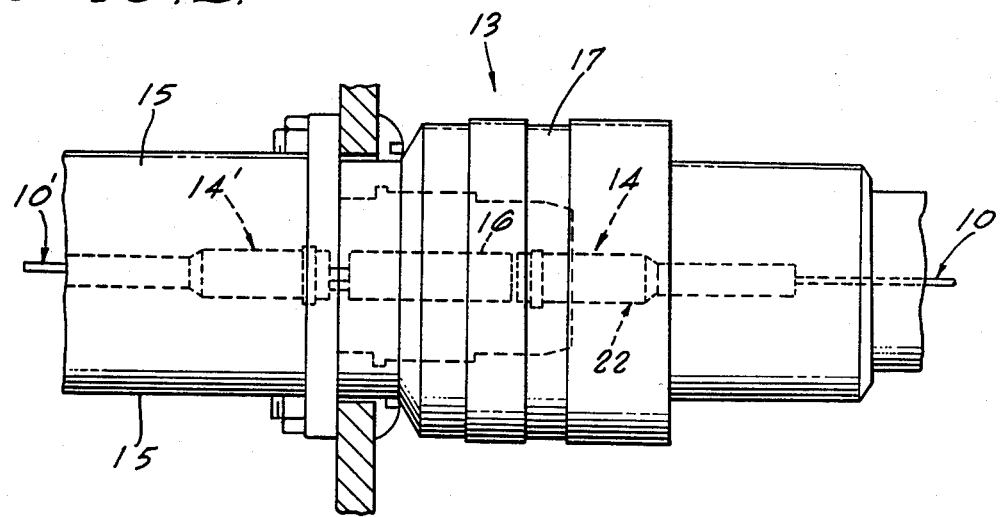
FIG. 2 shows the connector parts of FIG. 1 in mated relation.
Figure 3:
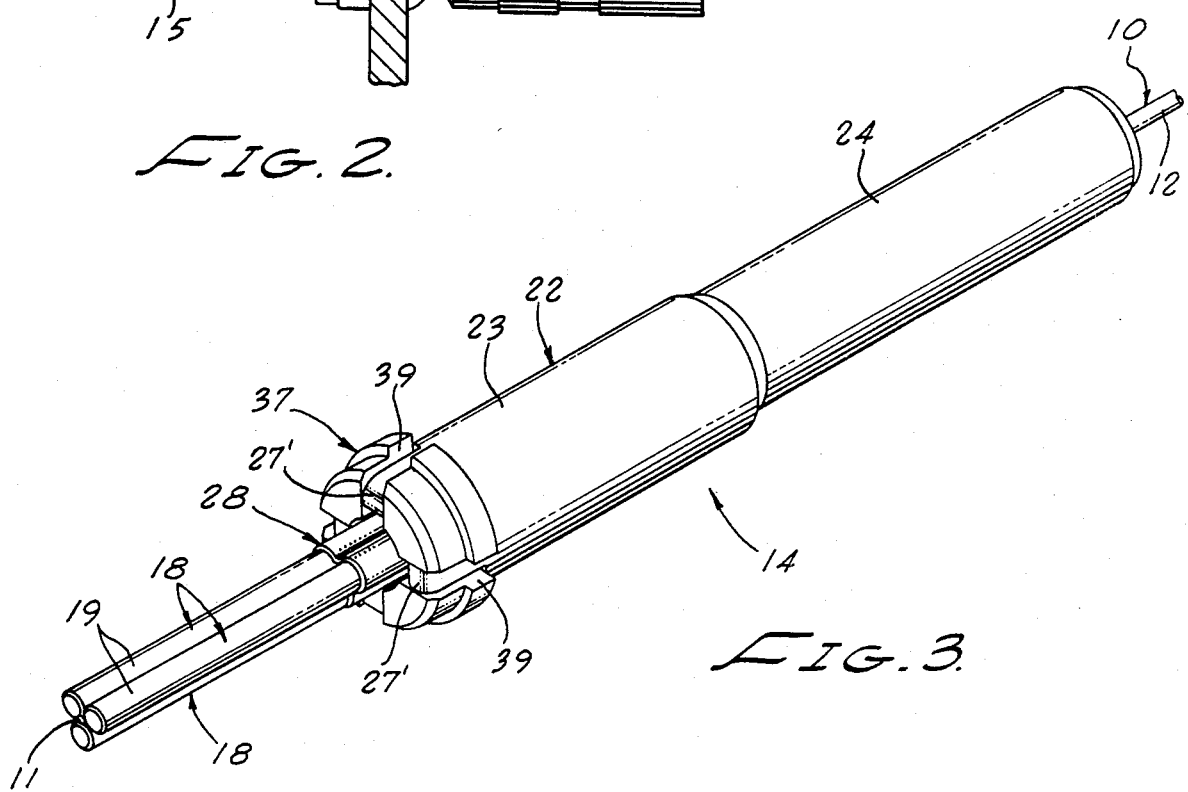
FIG. 3 is a perspective view of a fiber contact of the invention showing an optical fiber in place.
Figure 9:
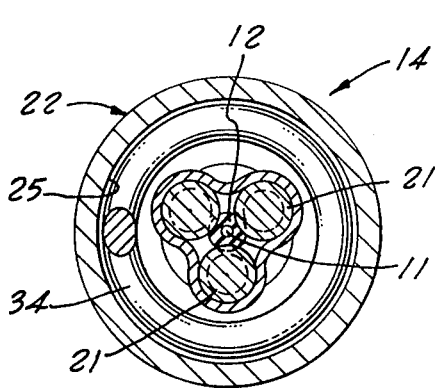
Figure 10:
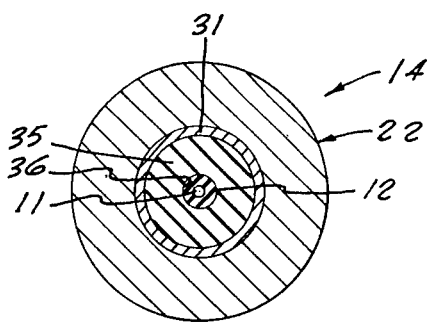

Although the described connector is sufficient by itself to establish connection between fibers and does not have to be mounted or otherwise included in other apparatus, it is contemplated that the fiber connector may itself be advantageously included within the elements of a typical plug and receptacle connector 13, as shown in FIGS. 1 and 2, for example, of the kind that is more typically used for interconnecting two multi-wire electrical cables together. That is, an incoming fiber 10′ mounted within a fiber contact 14′ to be described is, in turn, mounted within a receptacle 15 of the conventional plug and receptacle connector 13. Similarly, another fiber 10 is mounted within a fiber contact 14 identical to contact 14′ and which includes an alignment sleeve 16 to be described. The fiber 10, fiber contact 14 and alignment sleeve 16 are mounted with the connector plug 17.

When it is desired to interconnect the fibers, the plug and receptacle 17 and 15 are joined in the conventional manner which causes the end parts of the optical fibers carried by contacts 14 and 14′ to be received within the alignment sleeve 16 and thus properly orienting the optical fibers 10 and 10′ as depicted in FIG. 2. On the other hand, when it is desired to separate the fibers 10 and 10′, the plug and receptacle 17 and 15 are merely released from each other in the usual manner.

Figure 11:
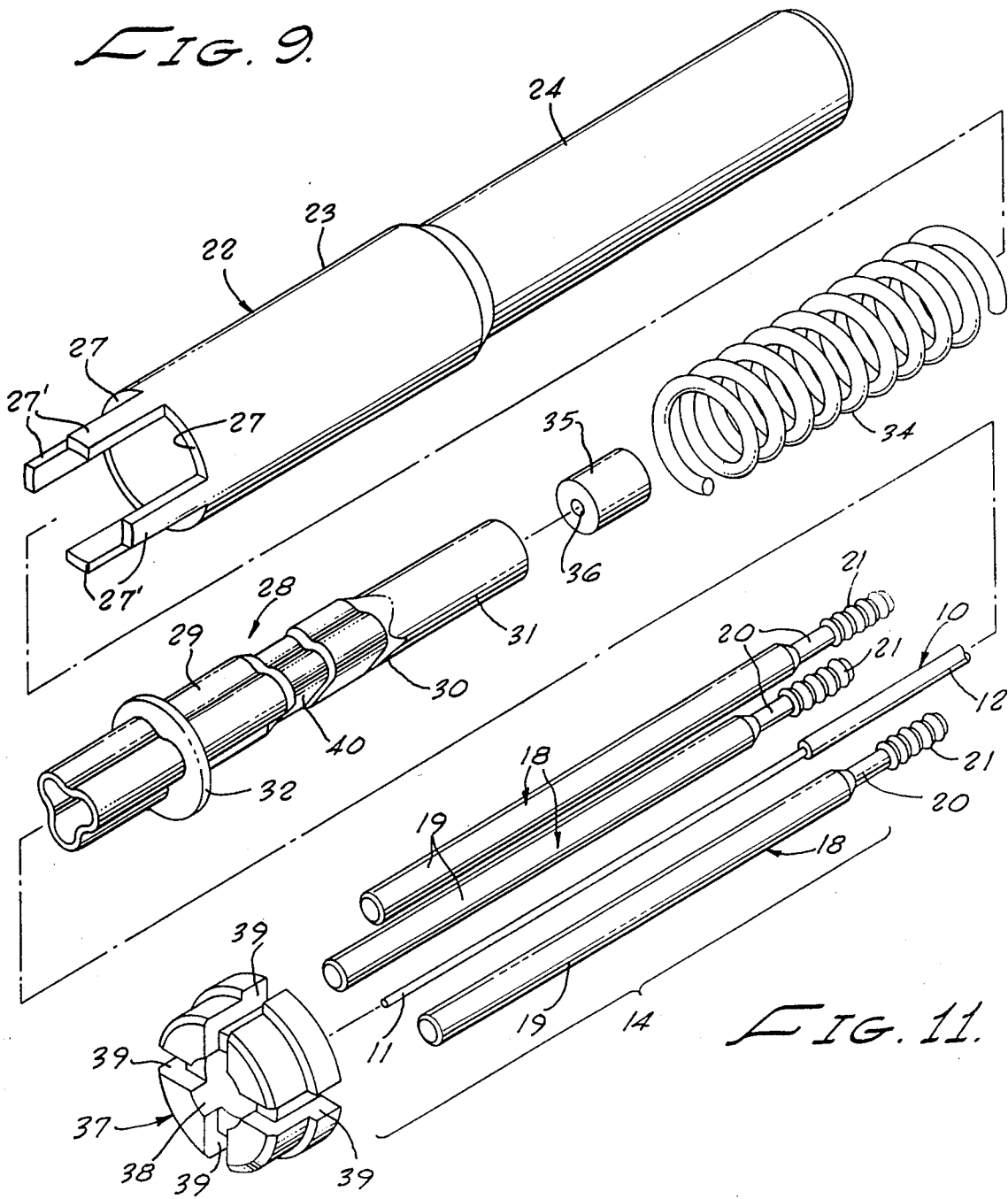
FIG. 11 is an exploded view of the fiber contact and fiber of FIG. 3.

Turning now to FIG. 11, the various parts of an optical fiber contact 14 are shown in exploded relation and they will be described at this time without other than general reference to the manner of interaction with each other.

Figure 19:
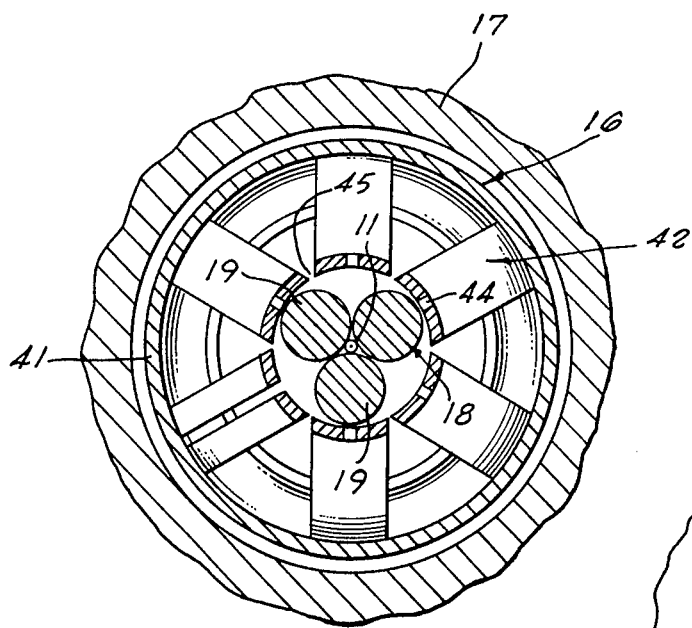
FIG. 19 is a sectional, end elevational view taken along the line 19—19 of FIG. 18.
Figure 21:
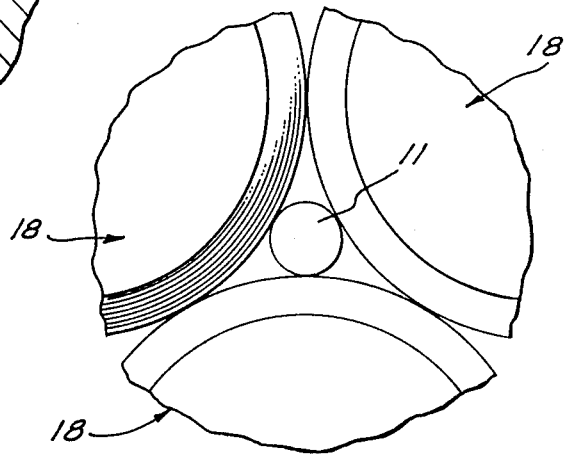
FIG. 21 is a sectional, elevational, greatly enlarged view taken along the line 21—21 of FIG. 20.
Figure 20:
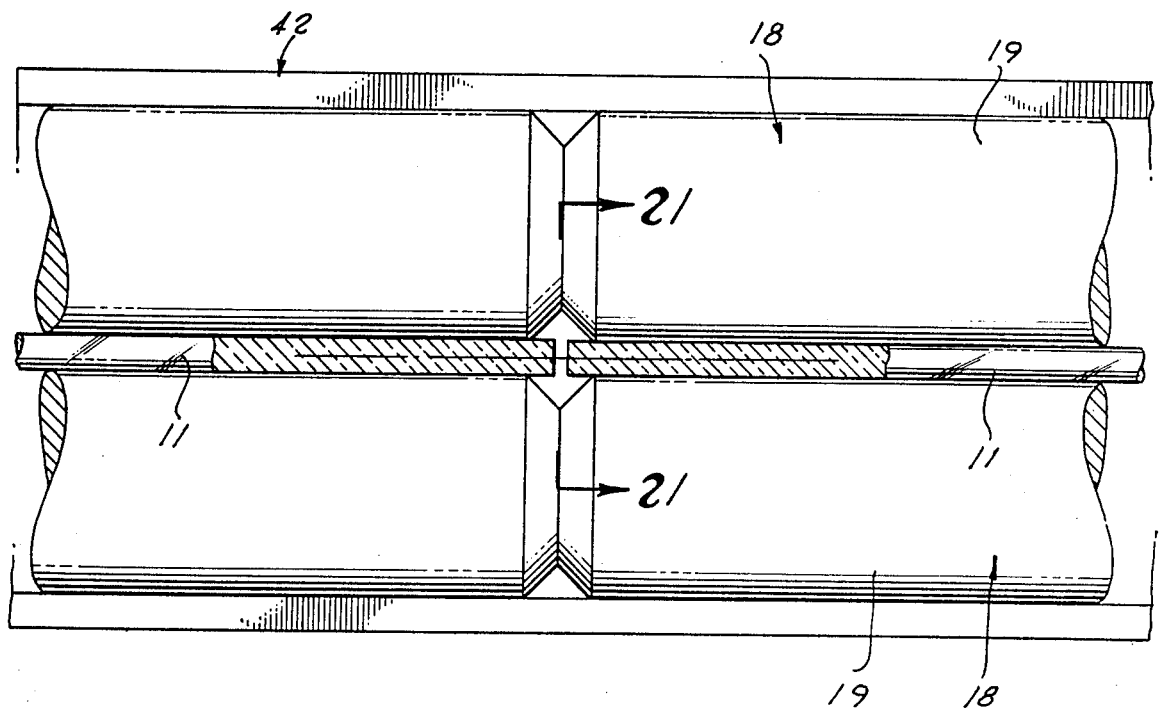
FIG. 20 is an enlarged side elevational view showing the fiber ends as they are related in accordance with this invention.

Three alignment pins 18 are provided for each holder with each being seen to include a cylindrical shaft portion 19 of uniform diameter, a smaller diameter portion 20 and an end portion having a plurality of mutually spaced, raised circular ridges 21 with relatively sharp outer edges. The diameter of the raised ridges is slightly less than that of the uniform portion 19 so that the three pins for each holder can be brought together with their circumferential peripheries of the portions 19 in mutual contacting relation as shown in FIG. 19. Due to the circular geometry of the pins, when the three are arranged in a parallel, circumferential peripheral contacting relationship there is a central opening extending completely along the uniform diametral portion 19, the dimensions of such opening permitting receipt of a stripped bare optical fiber (fiber 11) therewithin, with the three pins very precisely containing the fiber along lines angularly spaced at 120 degrees thereabout. Detailed assembly will be described later.

The contact housing 22 (FIG. 11) is an elongated, one-piece, hollow tubular member, approximately one-half thereof being of a relatively large outer diameter as at 23 and the other half 24 being of a smaller outer diameter. Moreover, as is shown best in FIG. 17, the housing part 23 includes a relatively large diameter circular bore 25 which is in communication with a smaller diameter bore 26 in the contact housing 22.

Turning again to FIG. 11, four rectangular slots 27 are formed in the outer end of the large diameter part 23 at 90 degree intervals.

An elongated hollow ferrule 28 has a triangular cross-section end portion 29 which tapers sharply as at 30 into a cylindrical end portion 31. A disklike location flange 32 is disposed on the triangular portion 29 spaced inwardly from its outer end. A central extent of the triangular part 29 (indicated by dashed lines) are formed or crimped inwardly for a reason and purpose to be described With reference now to FIGS. 11 and 17, the internal dimensions of the bore of the triangular part 29 (dashed lines) can be formed or crimped inwardly for a reason and purpose to be described.

With reference now to FIG. 17, the internal dimensions of the bore of the triangular part 29 are such that they can receive the three positioning pins 18 in the respective corners with the raised ridges 21 lying at the inner end of the triangular portion abutting against a shoulder 33 and defining the transition from the triangular bore to the circular bore 31. A coil spring 34 has an outer diameter enabling it to be fittingly received within the housing opening 25 and an internal diameter such that it can be received over the sleeve 29 and abut against the location plate 32 (FIG. 11). The unstressed spring length substantially equals that of the bore 25 measured to a point about midway of the slots 27.

A grommet 35 made of a soft compliant material, such as fluorosilicone rubber, has an outer diameter permitting snug receipt within the circular bore of the sleeve part 31. An axial opening 36 of the grommet is of such dimensions as to accommodate fittingly an optical fiber with insulative or protective covering 12 (FIG. 17).

An end cap 37 has portions which fit into the slots 27 at the end of the housing 22 and has other intervening parts fitting over the housing end portions such that the cap can be slipped onto the housing end and retained there for a purpose to be described. It also includes an axial opening 38 passing therethrough.

With reference now to both FIGS. 5 and 11, the end cap 37 is a one-piece, generally disklike member having an axial opening 38 of dimensions as to enable the three pins 18 and included fiber 11 to extend unimpeded therethrough. Four slots 39 are arranged at 90 degree angular circumferential spacing and extend longitudinally along the sides and across the outer face of the cap.

As to assembly of the fiber contact parts of FIG. 11, an optical fiber 10 the end of which is to be interconnected with another fiber is passed through the contact housing 22 and then through the spring 34. Next, the fiber receives the grommet 35 followed by the ferrule 28. At this point, an end portion of the fiber is stripped of its protective covering leaving the fiber bare of a length equal to that of the uniform diametral part 19 of an alignment pin plug part of the smaller diametral portion 20. The three alignment pins 18 are introduced through the opening near the flange 32 (FIG. 11) and arranged about the fiber with the raised ridges 21 being located at the innermost end of the triangular housing and contacting the fiber insulation 12. The triangular portion 29 of the ferrule 28 positions the three pins 18 at 120 degrees with respect to each other, and the uniform diameter portion 19 of each engages the bare fiber periphery. The pins and included fiber are inserted through the cap opening 38 and the faced-off end of the fiber is located inwardly of the outer ends of the three containing pins by a fixture (not shown). The ferrule is then adjusted in position and crimped about the pins whereby the pins are fixedly secured within the ferrule 28 at 120 degrees with respect to each other and the fiber is firmly positioned along the common passageway between the alignment pins. Now, the ferrule 28 with included pins and fiber are slidingly located within the slotted end of the housing 22 until they assume the position shown in FIG. 5. The tines 27' are then peened over to secure the end cap in place.

It is instructive toward a fuller understanding of the invention to note the different structural interrelationships of the contact assembled onto a fiber as it is shown in FIG. 5, for example. With the ferrule 28 crimped onto the pins 18 and included fiber, the ridges 21 dig into the fiber protective covering securing the fiber against the longitudinal movement relative to the shield. The cylindrical shaft portions 19 of pins 18 secure the bare fiber in a precise manner as has already been described and the ferrule walls at 40 fittingly engage the smaller diametral portion 20 of the pins as shown in FIG. 8, which acts to lock the pins within the ferrule. The coil spring 34 is compressed somewhat during assembly which serves as a resilient means resisting longitudinal movement of the ferrule 28 within the housing 22 and thereby maintaining the ends of the pins extending outwardly of the end cap.

Viewing along the fiber as assembled within the contact in FIG. 5, the three pins 18 including the bare fiber are of such total width dimensions as to permit their passing through cap opening 38 with only slight spacing from cap opening walls (FIG. 6). The ferrule triangular portion 29 fits closely about the three pins continuously contacting approximately one-half the outer peripheral surface of each pin (FIG. 7).

With a first fiber 10 or fiber part mounted in a contact 14 as has just been described, the second fiber or fiber part 10' is mounted in a further contact 14' which is identical to the holder 14. For that reason, no description will be given of the holder 14' construction.

Figure 12:
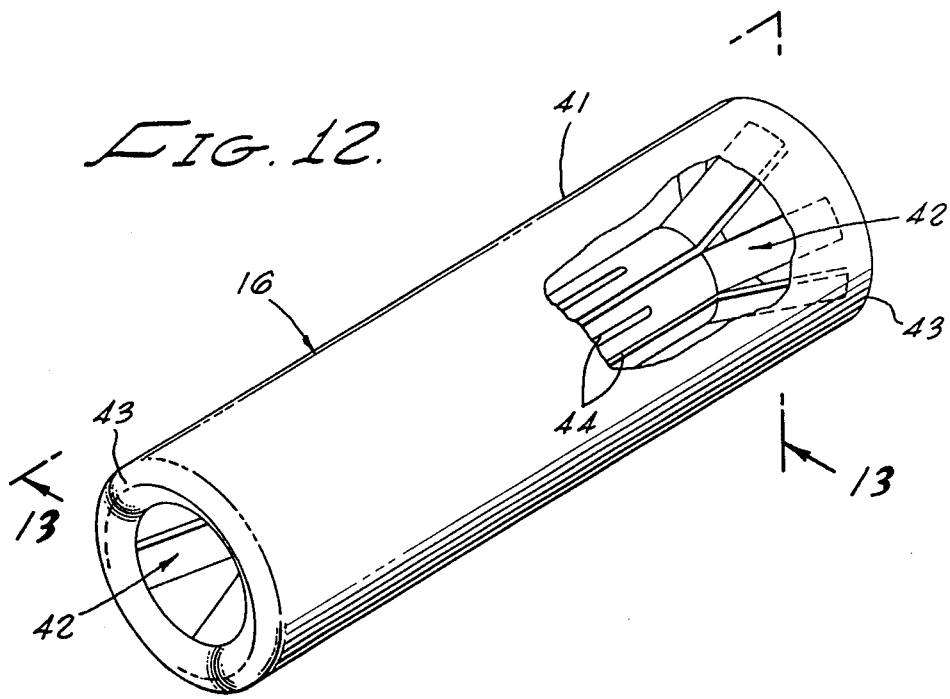
FIG. 12 is a perspective, partially fragmentary view of an alignment sleeve.
Figure 13:
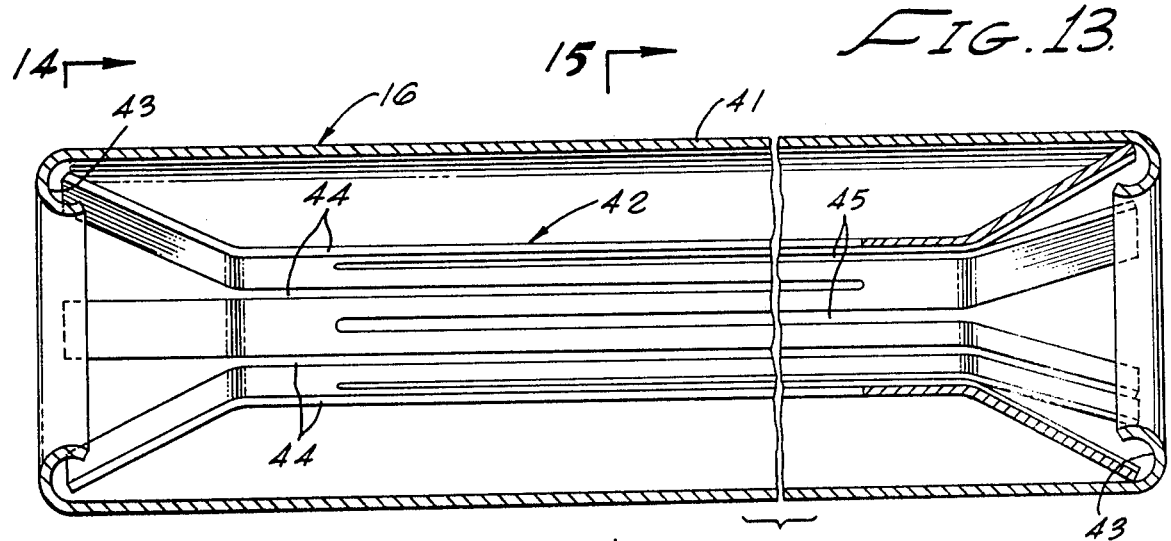
FIG. 13 is a sectional, side elevational view taken along the line 13—13 of FIG. 12.

For the ensuing description of the alignment sleeve 16 reference is made to both FIGS. 12 and 13, which sleeve is seen to include generally a tubular housing 41 and a resilient alignment means 42.

Specifically, the housing 41 includes a thinwall metal cylindrical tube with the circular ends bent radially inwardly and back towards the opposite end a slight amount. That is, each end of the sleeve terminates in a continuous circular concave shoulder 43 which faces inwardly of the sleeve toward the opposite end. The internal dimensions of the sleeve (diameter and length) have a specific relation to the alignment means that will be described.

Figure 14:
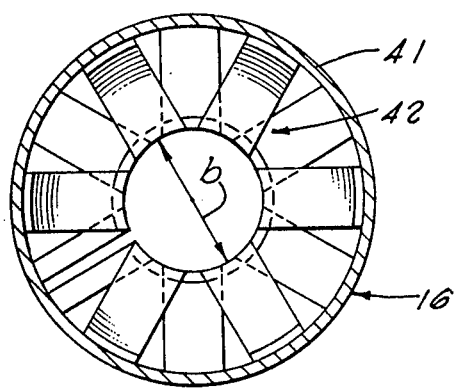
FIGS. 14 and 15 are sectional, end elevational views taken along respective lines 14—14 and 15—15 of FIG. 13.
Figure 15:
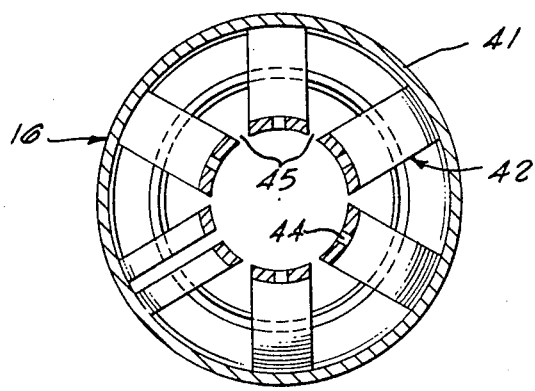
Figure 18:
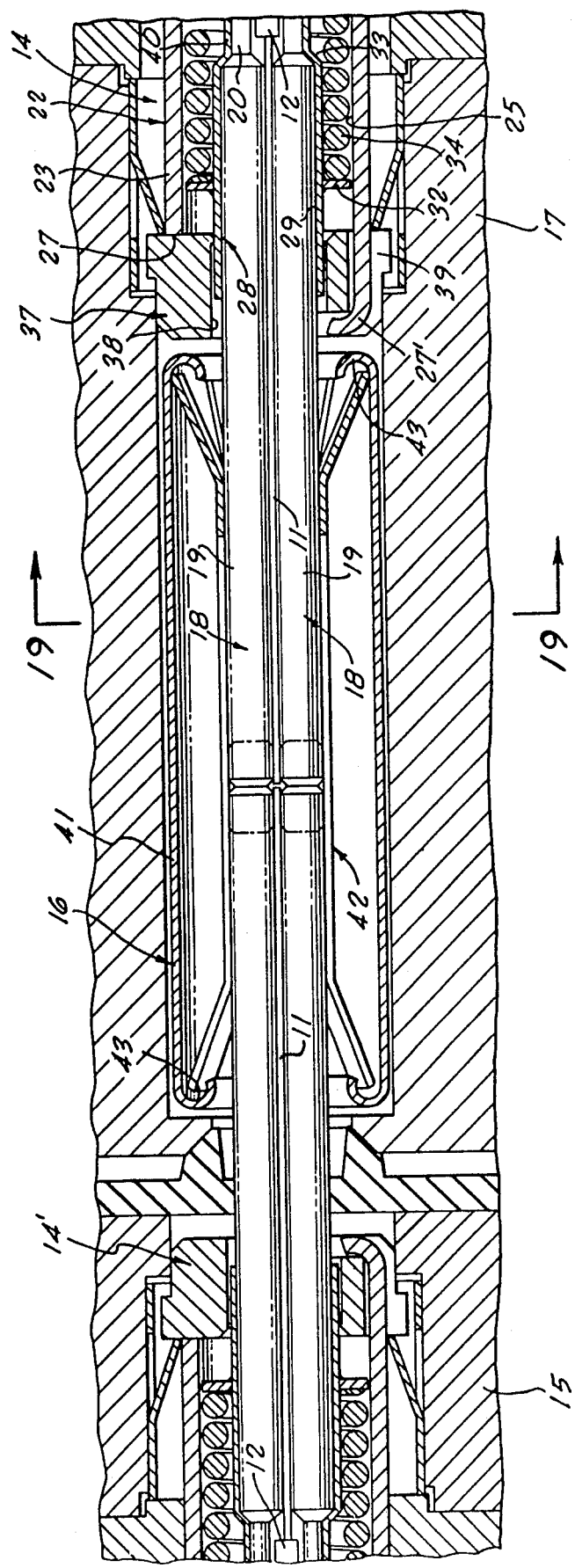
FIG. 18 shows a pair of fibers interconnected with the connector of this invention.
Figure 22:
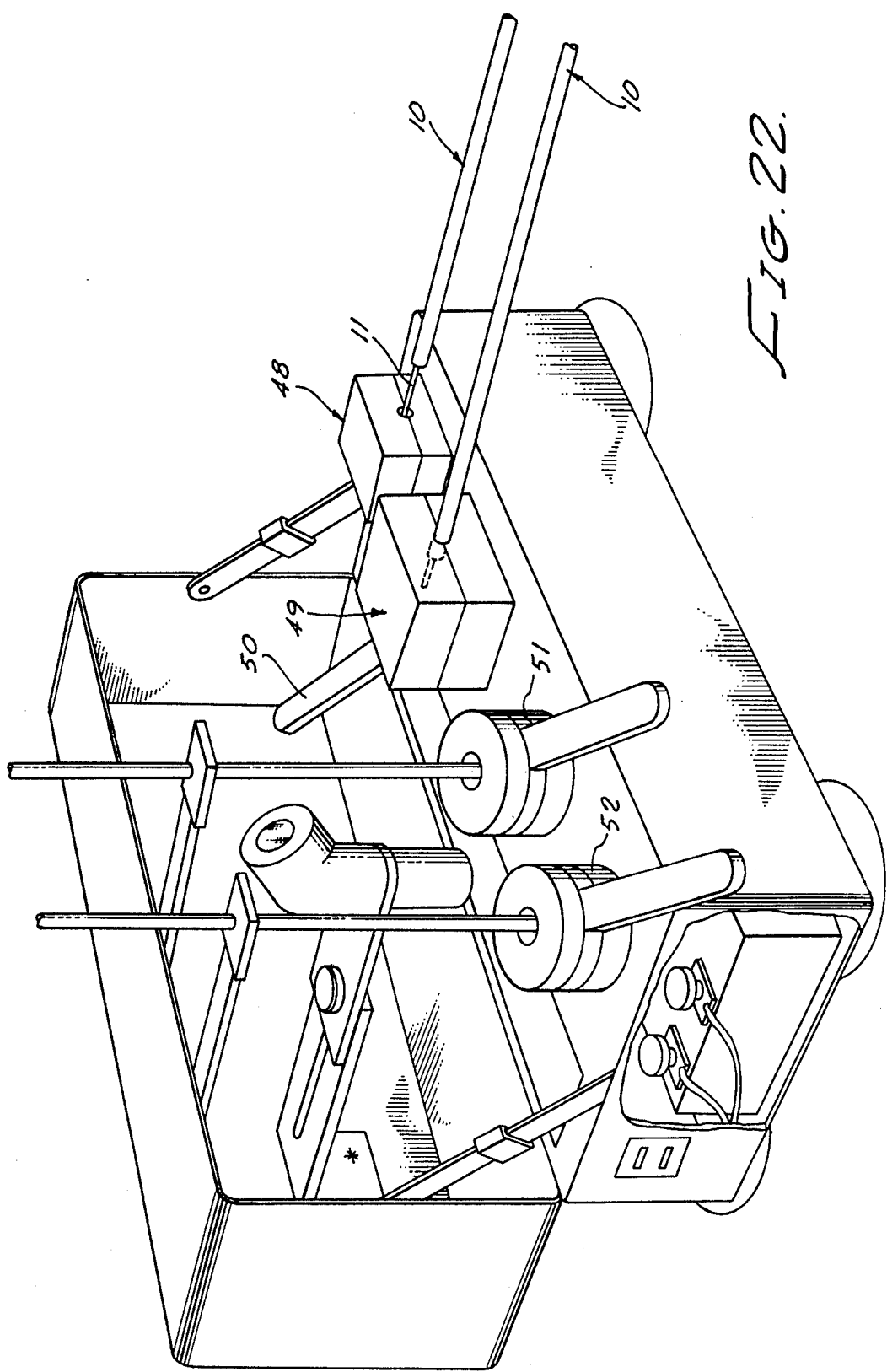
FIG. 22 is a perspective view of apparatus for use in providing fiber interconnections in accordance with this invention under field conditions.

Turning to FIG. 16, the alignment means or sleeve spring 42 is shown there in flat-sheet form as it is initially made. That is, the resilient means consists of a rectangular sheet of spring metal having a plurality of equally spaced slots 44 extending parallel to each other from one edge of the sheet. A further set of slots 45 extend from the opposite end to lie midway between the slots 44. The end portions are then bent about the axes 46 and 47 in the same direction. In assembly, the resilient means are formed into a tubular shape with lateral edges abutting and then slid into the housing 41 with the radially outwardly splayed end portions being anchored behind the shoulders 43 as shown in FIG. 13, for example. The central space of the resilient means has a cross-sectional dimension b (FIG. 14) enabling resilient receipt and retention of the two sets of pins and included fibers extending from contacts 14 and 14'. As already alluded to, a decided advantage of this invention is that due to its relative simplicity, fiber interconnections can be accomplished under field conditions. More particularly, as shown in FIG. 22 a complete set of equipment for achieving the various assembly steps for this invention may be carried in one portable enclosure. A stripping means 48 having spaced facing cutting surfaces removes the fiber cladding in much the same way that insulation is removed from an electric wire. A cutting tool 49 operable by a hand lever 50 cleaves the fiber leaving an end face closely approximating 90 degrees. Special fixtures 51 and 52 hold the fiber and connector parts while the contact is assembled and the ferrule clamped into place, respectively.

As alluded to earlier, the optical fiber connector described herein can be readily incorporated into a conventional electrical cable plug and receptacle connector (FIGS. 1 and 2). Also, although only one fiber connector is depicted in FIGS. 1 and 2 being used in a plug and receptacle connector, it is considered to be within the spirit of this invention to provide a plurality of such fiber connectors within the same plug and receptacle shells such that a number of optical fibers may be simultaneously connected/disconnected in accordance with this invention. Still further, the plug and connector shells protect the optical fiber connectors from the possibility of damage, as well as reinforcing and maintaining the fiber connection.

The described connector accomplishes reliable connection of optical fibers without the requirement for highly toleranced parts, the cost of which could be prohibitive. Also, this connector can be quickly and easily utilized under field conditions to interconnect two fibers or to repair broken or damaged fibers. Disassembly is a relatively simple matter and all of the connector parts, except perhaps the ferrule 28, can be salvaged and used again.

The invention claimed is:

1. A connector for a pair of optical glass fibers including a glass core, a glass cladding over said core, and a protective covering thereover, said pair of glass fibers each having an end portion extent of the protective covering removed and the glass core end faced off to 90 degrees, comprising:

a contact for each of the glass fibers including, three elongated members each having an elongated uniform diameter cylindrical portion and an end portion with radially outwardly extending securing means thereon, said members being so dimensioned as to enable forming an assembly about the glass fiber of the three members with the cylindrical portions simultaneously contacting each other and the bare glass core periphery along the full length of the bare glass core lying opposite the cylindrical portions and the securing means contacting the fiber protective covering, means for holding the three elongated members with their cylindrical portions arranged in mutual contacting relation and extending outwardly of the said holding means; and an alignment means for receiving the three elongated member assemblies from the pair of contacts and locating the outer ends of the two assemblies in end contacting relation.

2. A connector as in claim 1, in which the alignment means includes an elongated hollow sleeve spring having open ends, the sleeve spring walls being resilient and distended when the elongated member assemblies are received within the sleeve spring open ends.

3. A connector as in claim 2, in which the sleeve spring is constructed of a generally rectangular metal sheet of springlike material formed into a hollow tube with its end portions flared outwardly, and a sleeve housing containing the sleeve spring therein.

4. A connector as in claim 1, in which the securing means includes at least one raised ridge for pressing into the glass fiber protective covering when a glass fiber is received within three assembled elongated members.

5. A connector as in claim 1, in which the three elongated members of each contact are unitarily assembled together within a ferrule deformed about said elongated members;
   a housing having a cavity within which the ferrule and included elongated members are received and spring means within the housing cavity resiliently urging the elongated members outwardly of the housing.

* * * * *